United States Patent
Prencipe

(10) Patent No.: US 10,425,785 B2
(45) Date of Patent: Sep. 24, 2019

(54) CONTACT INFORMATION SOCIAL EXCHANGE METHOD AND SYSTEM

(71) Applicant: MCLEAR & CO., Los Angeles, CA (US)

(72) Inventor: Joseph Nicholi Prencipe, Tokyo (JP)

(73) Assignee: MCLEAR & CO., Los Angeles, CA (US)

( * ) Notice: Subject to any disclaimer, the term of this patent is extended or adjusted under 35 U.S.C. 154(b) by 0 days.

(21) Appl. No.: 15/795,175

(22) Filed: Oct. 26, 2017

(65) Prior Publication Data

US 2018/0249305 A1  Aug. 30, 2018

Related U.S. Application Data

(63) Continuation of application No. 15/096,116, filed on Apr. 11, 2016, which is a continuation of application
(Continued)

(51) Int. Cl.
*H04B 5/02* (2006.01)
*H04W 4/20* (2018.01)
(Continued)

(52) U.S. Cl.
CPC ............. *H04W 4/21* (2018.02); *H04W 4/80* (2018.02)

(58) Field of Classification Search
CPC ............................ H04B 1/38; H04B 1/3888; 04B 2001/3861; H04B 1/385; H04B 1/3827;
(Continued)

(56) References Cited

U.S. PATENT DOCUMENTS

| 5,382,778 A | 1/1995 | Takahira et al. |
| 5,832,296 A | 11/1998 | Wang et al. |

(Continued)

FOREIGN PATENT DOCUMENTS

| EP | 1220501 A2 | 7/2002 |
| WO | WO2009/134644 A1 | 11/2009 |

(Continued)

OTHER PUBLICATIONS

Anonymous: "Share Valuable Information by Shaking Hands." Walyou.com. Jan. 11, 2008 (Jan. 11, 2008), 13 pages XP055270684, Retrieved from the Internet: URL:http://walyou.com/share-valuable-information-by-shaking-hands/ [retrieved on Sep. 27, 2017].

(Continued)

*Primary Examiner* — Blane J Jackson
(74) *Attorney, Agent, or Firm* — Winston & Strawn LLP

(57) ABSTRACT

Methods, systems, and computer storage media for a wearable device are presented. The wearable device includes a wearable housing and a transceiver attached to the wearable housing and configured to receive a first data item. The first data item is contact information or an event identifier. The transceiver is further configured to transmit a second data item. The second data item is contact information. The transceiver has an effective range of less than one meter. The transceiver is able to receive the first data item and transmit the second data item in less than three seconds. The wearable device also includes a memory configured to store the first data item and the second data item.

51 Claims, 8 Drawing Sheets

Related U.S. Application Data

No. 13/730,063, filed on Dec. 28, 2012, now Pat. No. 9,313,609.

(51) Int. Cl.
*H04W 4/21* (2018.01)
*H04W 4/80* (2018.01)
*H04B 1/38* (2015.01)

(58) Field of Classification Search
CPC ............ H04B 5/00; H04W 4/21; H04W 4/80; H04W 4/20
See application file for complete search history.

(56) References Cited

U.S. PATENT DOCUMENTS

| | | | |
|---|---|---|---|
| 6,078,260 | A | 6/2000 | Desch |
| 6,104,913 | A | 8/2000 | Masahide Tanaka |
| 7,023,350 | B2 | 4/2006 | Sanchez et al. |
| 7,082,316 | B2 | 7/2006 | Eiden |
| 7,161,484 | B2 | 1/2007 | Tsoukalis |
| 7,315,242 | B2 | 1/2008 | Eisenman |
| 8,107,920 | B2 | 1/2012 | Ben Ayed |
| 8,116,724 | B2 | 2/2012 | Peabody |
| 8,157,161 | B2 | 4/2012 | Yach |
| 8,244,550 | B2 | 8/2012 | Sim et al. |
| 8,421,748 | B2 | 4/2013 | Tanaka |
| 8,525,670 | B1 | 9/2013 | Khaira |
| 8,655,271 | B2 | 2/2014 | Brostrom |
| 9,265,310 | B2 * | 2/2016 | Lam ................ H04W 84/18 |
| 9,313,609 | B2 | 4/2016 | Prencipe |
| 9,613,240 | B2 | 4/2017 | Boulby |
| 2004/0215958 | A1 | 10/2004 | Ellis et al. |
| 2007/0107673 | A1 | 5/2007 | Langer et al. |
| 2008/0048036 | A1 | 2/2008 | Matsumoto et al. |
| 2009/0273439 | A1 * | 11/2009 | Selsor ................ G06F 21/35 340/5.61 |
| 2010/0021176 | A1 | 1/2010 | Holcombe et al. |
| 2012/0016793 | A1 * | 1/2012 | Peters ................ G06Q 20/10 705/39 |
| 2012/0023169 | A1 | 1/2012 | Kang et al. |
| 2012/0218184 | A1 | 8/2012 | Wissmar |
| 2012/0309312 | A1 | 12/2012 | Sim et al. |
| 2014/0065956 | A1 | 3/2014 | Yang et al. |
| 2014/0065958 | A1 | 3/2014 | Yao et al. |
| 2014/0102136 | A1 | 4/2014 | Warren |
| 2014/0120983 | A1 | 5/2014 | Lam |
| 2014/0179230 | A1 | 6/2014 | Sydir et al. |
| 2015/0178532 | A1 | 6/2015 | Brule |
| 2015/0332031 | A1 | 11/2015 | Mistry et al. |
| 2017/0098057 | A1 * | 4/2017 | Poutiatine ............. A61J 7/0053 |
| 2017/0185879 | A1 | 6/2017 | Boulby |
| 2018/0242124 | A1 | 8/2018 | Prencipe |

FOREIGN PATENT DOCUMENTS

| | | |
|---|---|---|
| WO | WO2011/053235 A1 | 5/2011 |
| WO | WO2014/105891 A1 | 7/2014 |

OTHER PUBLICATIONS

Examination Report issued in European Patent Application No. 13867035.1-1222, dated Mar. 12, 2018 (Mar. 12, 2018), 5 pages.

Extended/Supplemental European Search Report issued in European Patent Application No. 13867035.1-1958, dated May 24, 2016 (May 24, 2016). 8 pages.

Heimbuch, Jaymi, "POKENs Ditch Paper Business Cards, Could Make Shaking Hands More Than a Friendly Gesture." <http://www.treehugger.com/clean-technology/pokens-ditch-paper-business-cards-could-make-shaking-hands-more-than-a-friendly-gesture.html/>, Jan. 22, 2010. Web. Jul. 16, 2016. 4 pages.

International Search Report and Written Opinion issued in International Application No. PCT/US13/77675, dated Jun. 4, 2017 (Jun. 4, 2014). 9 pages.

Kanis, Marje, et al., "Toward wearable social networking with iBand." CHI EA '05 CHI '05 Extended Abstracts on Human Factors in Computing Systems. pp. 1521-1524, Portland, OR, USA—Apr. 2-7, 2005—https://dl.acm.org/citation.cfm?id=1056956.

Labrune, Jean-Baptiste, and Wendy Mackay. "Telebeads: Social Network Mnemonics for Teenagers." IDC '06 Proceedings of the 2006 conference on interaction design and children. pp. 57-64. Tampere, Finland. Jun. 7-9, 2006. https://dl.acm.org/citation.cfm?id=1139092&dl=ACM&coll=DL&CFID=989784749&CFTOKEN=27576534.

Iida, Kazuki, et. al. "Enhanced Touch: A Wearable Device for Social Playware" ACE '11 Proceedings of the 8th International Conference on Advances in Computer Entertainment Technology. Article No. 83 Lisbon, Portugal—Nov. 8-11, 2011 ACM New York, NY, USA © 2011. pp. 1-2, https://dl.acm.org/citation.cfm?id=2071524.

* cited by examiner

CONTACT INFORMATION SOCIAL EXCHANGE METHOD AND SYSTEM

CROSS-REFERENCE TO RELATED APPLICATIONS

This application is a continuation of application Ser. No. 15/096,116 filed Apr. 11, 2016, which is a continuation of application Ser. No. 13/730,063, filed Dec. 28, 2012, now U.S. Pat. No. 9,313,609. The content of each prior application is expressly incorporated herein by reference thereto.

BACKGROUND

Networking for business or other social purposes traditionally involved meeting in person and exchanging business cards or contact information written on a piece of paper or cocktail napkin. Social networking sites such as Facebook and LinkedIn provided individuals with an electronic means of making new contacts or maintaining contact and other information about old contacts without being physically present.

Further, as mobile phones and other mobile devices became more ubiquitous, contact information could be manually entered into and stored by a phone during an in-person meeting. However, such manual entry results in an awkward pause in the social interaction and can introduce errors into the contact information. Applications developed that enable a business card or bar code information to be scanned into a mobile phone, but such an approach still introduces an awkward pause in the social interaction and is rendered less effective or even useless if one or both of the participants run out of business cards.

SUMMARY

The following presents a simplified summary of the disclosure in order to provide a basic understanding to the reader This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In one embodiment, a wireless communications enabled device is worn by a user. When the device detects the presence of a compatible device (e.g., another device worn by a second user), the device initiates a transaction in which the device receives contact information from the compatible device and/or sends the users contact information to the compatible device. Contact information can include a phone number, an e-mail address, a mailing address, a website, a user name or user identifier for online service (e.g., a social networking site), information usable to obtain contact information online, or any other information that is usable to contact a user.

In one embodiment, the wireless communications enabled device is a ring. A wireless communications unit, or transceiver, is embedded, enclosed, or substantially enclosed within the band portion of the ring. In another embodiment, a wireless communications unit is within, below, or otherwise associated with a decorative portion of a ring. The decorative portion may include a stone, metal or other material and can be purely decorative or indicative of association with some organization (e.g., a class ring, a fraternity, sorority or other society ring, etc.). In one embodiment, the decorative portion including the wireless unit, is detachable from the band portion of the ring and is configured to be attachable to any of a plurality of rings of different sizes and different materials.

In one embodiment, the wireless communications enabled device is a bracelet. A wireless communications unit, or transceiver, is embedded, enclosed, or substantially enclosed within the band portion of the bracelet. In another embodiment, a wireless communications unit is within, below, or otherwise associated with a decorative portion of a bracelet such as a charm or any other decorative portion. The decorative portion may include a stone, metal or other material and can be purely decorative or indicative of association with some or (e.g., a class school and/or year identifier, a fraternity, sorority or other society identifier, etc.). In one embodiment, the decorative portion including the wireless unit is detachable from the band portion of the bracelet and is configured to be attachable to any of a plurality of bracelets, rings, necklaces or other worn items of different sizes and different materials. It should be understood that in various embodiments, the wireless communication enabled device can be part of or attached to a necklace, oar ring, piercing, or any other type of wearable item.

In one embodiment, the communicative range of the wireless device is short enough that close proximity (e.g., less than a foot or some number of inches, such that a handshake between two users wearing wireless communications enabled rings on their shaking hands to come within range of each other, but two users merely standing near each other are unlikely to have their rings come within range of each other) is necessary for communication to take place. In other embodiment, a wireless device is able to initiate communication with another device and exchange contact information with that other device in less time than it takes to complete a typical handshake (e.g., a few seconds). In one embodiment, the wireless device is a radio frequency identification (RFID) device. On other embodiments, the wireless device is any other suitable wireless device, including but not limited to an infra-red device, a sonic device, or a radio device. In one embodiment, the transceiver is connected to the ring's band and uses the hand as an antenna for receiving, transmitting, and/or receiving inductive energy. In another embodiment, the transceiver's antenna is Meddled on a chip or board of the transceiver.

In one embodiment, the wireless device includes a memory unit which stores contact information of a user. Typically, the user is the wearer of the ring, however the contact information could be for a user other than the wearer (e.g., a department within a corporation, a political campaign, a business, etc.).

In one embodiment, the wireless device includes a battery. The battery is used to periodically transmit a signal announcing the wireless device's presence or to transmit other information. The battery may also be used to detect and receive signals from other devices and/or to store information in memory. However, receipt of signals may be a passive activity, powered by induction or other means using the energy of the signals being received. In one embodiment, the battery is rechargeable by any suitable recharging method, including but not limited to induction (e.g., from a charging station or from ambient electromagnetic radiation), direct current form a charging station, photovoltaic or solar devices, or a motion to electricity device.

In one embodiment, the wireless device can communicate with a base station. The base station can be a mobile phone or other mobile device, a computer (e.g., laptop, desktop, tablet, etc.). The wireless device can upload to the base station any contact information received by the wireless device. In one embodiment, the contact information is an identifier. The vase station contacts a service provider to obtain the contact information associated with the identifier. The user can then add the contact information to a user's contacts list or otherwise store the contact information for later retrieval.

In one embodiment, the base station searches for schedule information of the user. The schedule information can be events in an electronic calendar (e.g., a Microsoft Outlook Calendar, a Microsoft Live Calendar, a Google Calendar, etc.) or from a social networking site (e.g., a Facebook event). The base station presents one or more scheduled events to the user and the user is able to associate one or more contacts with a scheduled event. (e.g., an alumni mixer, an association's dinner, a fundraising event, a trade show, a conference, etc.). Further, in one embodiment, the User can add additional notes to the contact information.

In one embodiment, the wireless communications enabled device is equipped with an on/off mechanism (e.g., a switch, a button, a ring band presence sensor, a finger presence sensor, etc.). In another embodiment, the wireless communications enabled device includes a contact receipt indicator. In one embodiment the indicator is any visual indicator, audible indicator, or tactile indicator, including but not limited to a light emitting diode (LED) or a vibration device. In one embodiment, the indicator activate upon receipt of contact information and remains active a pre-set amount of time. In another embodiment, the indicator activates upon receipt of contact information and remains active until deactivated manually.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Further, various illustrated or described portions of processes may be re-ordered or executed in parallel in various different embodiments.

Although the present examples are described and illustrated herein as being implemented in a wireless communications enabled ring, the system described is provided as an example and not a limitation. As those skilled in the art will appreciate, the present examples are suitable for application in a variety of different types of wearable wireless communications enabled devices.

In one embodiment, a wireless communications enabled device is worn b a user. When Ole device detects the presence of a compatible device another device worn by a second user), the device initiates a transaction in which the device receives contact information from the compatible device and/or sends the users contact information to the compatible device. Contact information can include a phone number, an e-mail address, a mailing address, a website, a user name or user identifier for an online service (e.g., a social networking site), information (e.g., a personal identification number (PIN) or other identifier) usable to obtain contact information online, or any other information that is usable to contact a user.

In one embodiment, the wireless communications enabled device is a ring. In other embodiment, the wireless communications enabled device is a watch, a bracelet, or any other article wearable on a hand, finger or wrist. A wireless communications unit, or transceiver, is embedded, enclosed, or substantially enclosed within the band portion of the ring.

Figure 1:
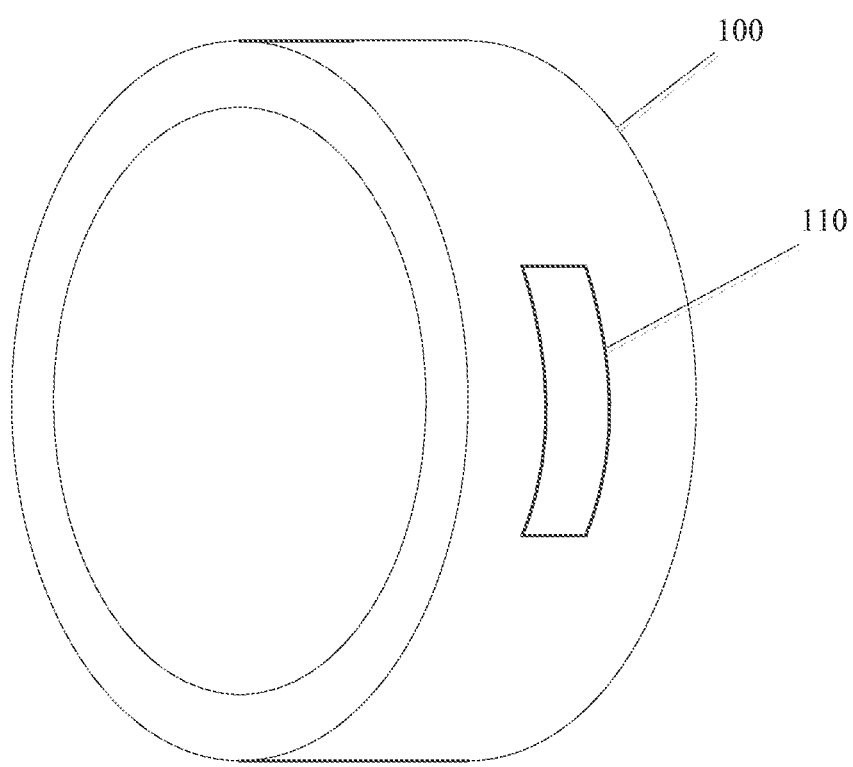
FIG. 1 is a block diagram of a wireless communications enabled ring in accordance with one embodiment.

FIG. 1 is a block diagram of a wireless communications enabled ring in accordance with one embodiment. The ring includes a band 100. The band can be formed from any suitable material, including but not limited to plastic, gold, silver, any metallic alloy or any combination of suitable materials. A wireless communications unit 110 (e.g., a transceiver, the AT90RF135602 from Atmel and Innovision Research & Technology, or any other suitable device) is attached to or embedded in the band 100.

In another embodiment, a wireless communications unit is within, below, or otherwise associated with a decorative portion of a ring. The decorative portion may include a stone, metal or other material and can be purely decorative or indicative of association with some organization (e.g., a class ring, a fraternity, sorority or other society ring, etc.). In one embodiment, the decorative portion including the wireless unit is detachable from the band portion of the ring and is configured to be attachable to any of a plurality of rings of different sizes and different materials. In various embodiments, the detachable portion is attachable to a ring band by snapping the detachable portion onto the ring and, by lashing the detachable portion to the ring band, by clamping the detachable portion to the ring band, by adhesive, by magnetism or any other suitable fastening mechanism or technique. Similarly, in other embodiments, a wireless communications enabled device is included in a detachable unit that is attachable to a watch or a bracelet.

Figure 2:
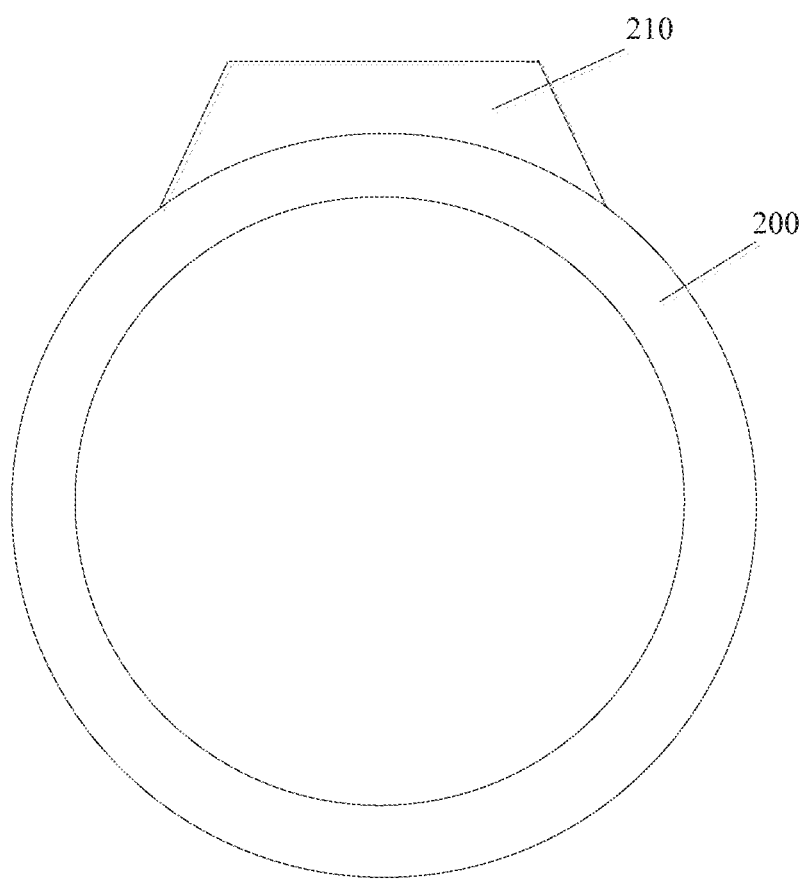
FIG. 2 is a block diagram of a wireless communications enabled ring having a decorative portion in accordance with one embodiment.

FIG. 2 is a block diagram of a wireless communications enabled ring having a decorative portion in accordance with one embodiment. The ring includes a band 200 and a decorative portion 210. A wireless communications unit is attached to or embedded in the decorative portion 210.

In one embodiment, the communicative range of the wireless device is short enough that close proximity (e.g., less than a yard, a meter, a foot, some number of inches, three to seven centimeters, etc., any other distance such that a handshake between two users wearing wireless communications enabled rings on their shaking hands to come within range of each other, but two users merely standing near each other are unlikely to have their rings come within range of each other) is necessary for communication to take place. In another embodiment, a wireless device is able to initiate communication with another device and exchange contact information with that other device in less time than it takes to complete a typical handshake a few seconds, less than one second, etc.).

In other embodiments, the wireless device is able to initiate communications with another device and exchange contact information with that other device in less time than, it takes to pass through a door (e.g., when another device operable with the wireless device is placed near a doorway (e.g., within several feet of the door) or along a path traversed by individuals attending or entering an event. In one embodiment, the wireless device is usable to take roll for a meeting. As attendees traverse a path within range of a device capable of interacting with the individuals wireless devices, their presence is noted. The presence information can be automatically transmitted to a meeting minutes recorder and or automatically entered into the minutes. Further, the automatic presence notification can cause the presence of a quorum, as defined by the entity meeting (e.g., a majority of members, a majority of members in good standing, some supermajority of members or members in good standing, or any other fraction or percentage or fixed number of any category of attendee or potential attendee, regardless of whether quorum is greater than, equal to, or less than a majority), to be automatically entered into the minutes or displayed to one or more individuals (e.g., the organization meeting's secretary). In another embodiment, the same device interacting with the meeting attendees' wireless devices or a separate device can be used to determine when attendees leave the meeting. Similarly to above, this absence can be automatically recorded, entered, transmitted or otherwise made known, as earl any resulting loss of quorum or other condition pertinent to the rules, constitution, by-laws or any other governing documents of the organization meeting. In further embodiments, the wireless device and the one or more other devices can be used to determine the timing and/or duration of an individual's attendance at an event (e.g., a company's annual employee training session, a continuing legal education class, a continuing medical education class). An amount of excusable absence may be defined (e.g., missing some portion of the beginning or the end or a portion of the time between, so long as the total absence doesn't exceed a threshold, the number of absences doesn't exceed a threshold, and/or any one absence doesn't exceed a threshold), and an individual associated with the wireless device can receive a message (e.g., text message, e-mail, phone call, instant message, private message, talk request, etc.) if the individual is within a threshold of violating the attendance rules (e.g., a thirty second warning before an individual break outside of the meeting world be too long to count the individual as attending the meeting), if the individual has violated the meeting requirements and won't be counted as attending the meeting will only be counted as attending some portion of the meeting, or if the individual has satisfied the requirements for attending the meeting.

In one embodiment, the wireless device is a radio frequency identification (RFID) device. On other embodiments, the wireless device is any other suitable wireless device, including hut not limited to an infra red device, a sonic device, or a radio device. In one embodiment, the transceiver is connected to the ring's band and uses the band as an antenna for receiving, transmitting, and/or receiving inductive energy. In another embodiment, the transceiver's antenna is included on a chip or board of the transceiver.

In one embodiment, the wireless device includes a memory unit which stores contact information of a user. Typically, the user is the wearer of the ring, however the contact information could be for a user other than the wearer (e.g., a department within a corporation, a political campaign, a business, etc.).

Figure 3:
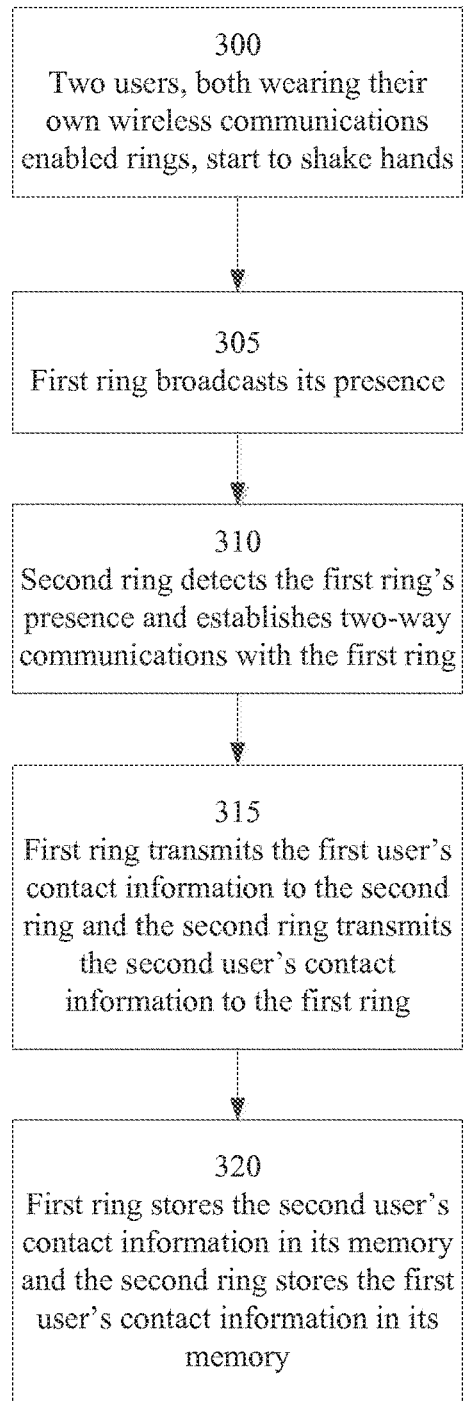
FIG. 3 is a flow diagram of the process of two users exchanging contact information in accordance with one embodiment.

FIG. 3 is a flow diagram of the process of two users exchanging contact information is in accordance with one embodiment. At block 300, two users, both wearing their own wireless communications enabled rings, start to shake hands. At block 305, a first ring broadcasts its presence. At block 310, the second ring detects the first ring's presence and establishes two-way communications with the first ring. At block 315, the first ring transmits the first user's contact information (e.g., an identifier or PIN) to the second ring and the second ring transmits the second user's contact information to the first ring. At block 320, the first ring stores the second user's contact information in its memory and the second ring stores the first user's contact information in its memory.

In one embodiment, the wireless device includes a battery. The battery is used to power the device to periodically transmit a signal announcing the wireless device's presence, or to transmit other information. The battery may also be used to power the device to detect and receive signals from other devices and/or to store information its memory. However, receipt of signals may be a passive activity, powered by induction or other means using the energy of the signals being received (e.g., the energy of radio waves). In one embodiment, the battery is rechargeable by any suitable recharging method, including but not limited to induction (e.g., from a charging station or from ambient electromagnetic radiation), direct current form a charging station, photovoltaic or solar devices, or a motion to electricity device.

Figure 4A:
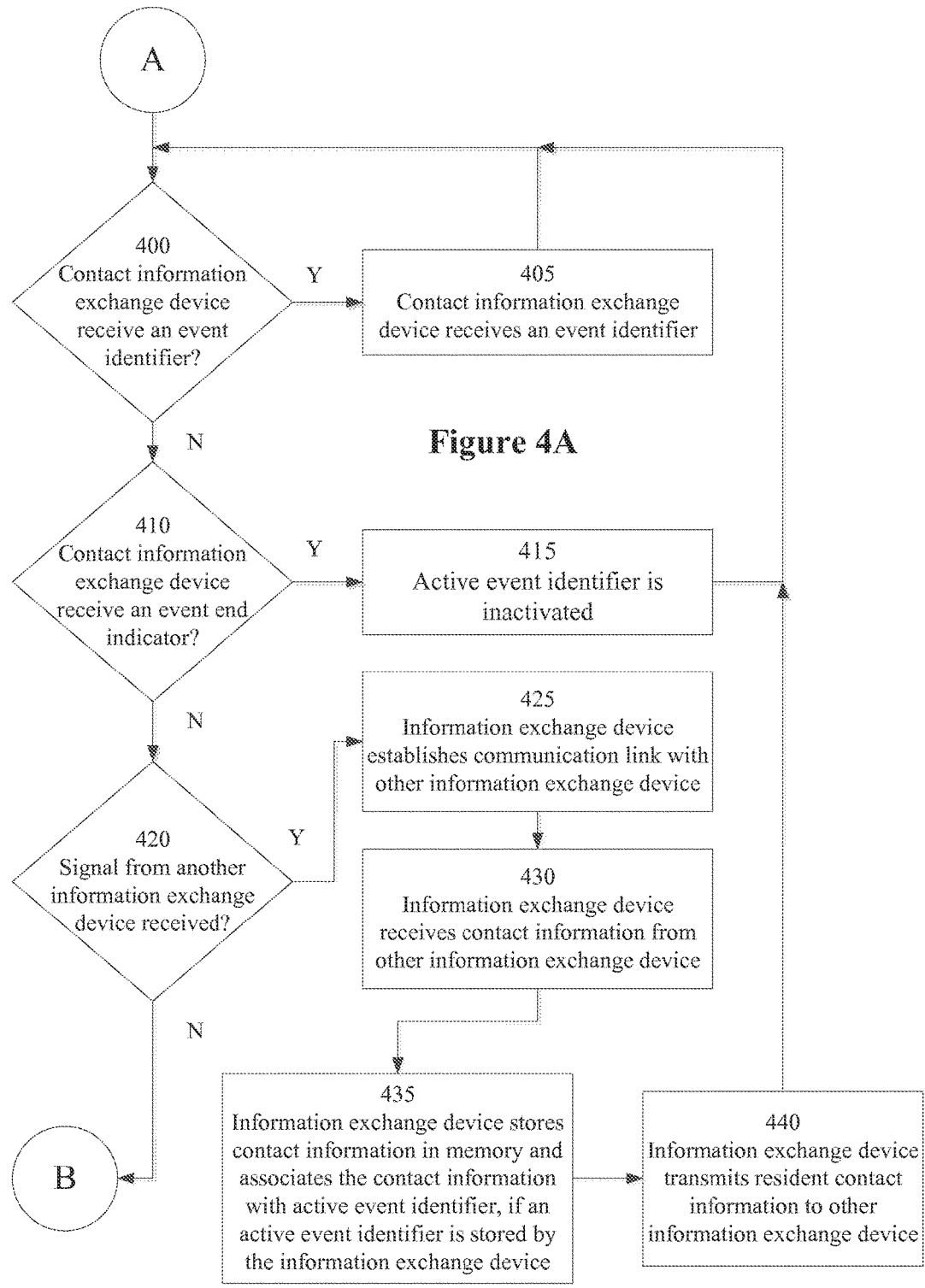
FIG. 4A is a portion of a flow diagram of the operation of a wireless communications enabled device in accordance with one embodiment.
Figure 4B:
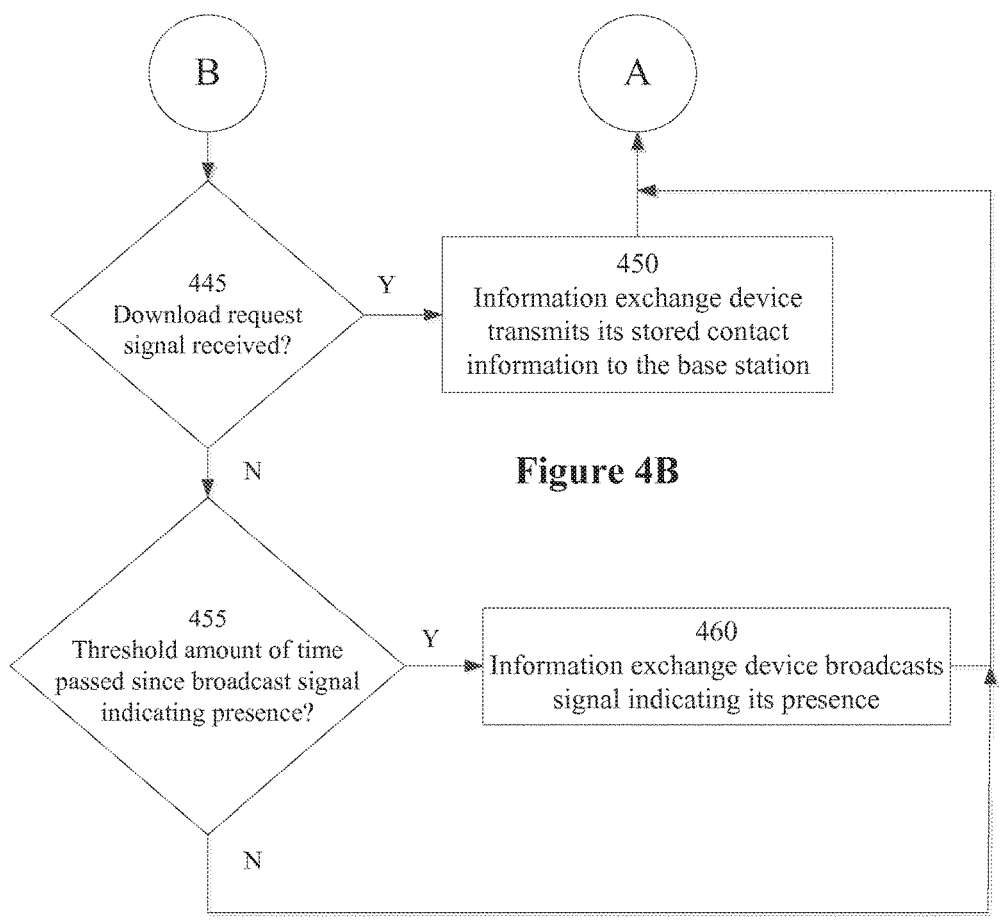
FIG. 4B is a portion of a flow diagram of the operation of a wireless communications enabled device in accordance with one embodiment.

FIG. 4A and FIG. 4B illustrate a flow diagram of the operation of a wireless communications enabled device, or a contact information exchange device, in accordance with one embodiment. At block 400, it is determined whether the contact information exchange device receives an event identifier. If the contact information exchange device receives an event identifier, at block 405, the event identifier is stored and any previously stored event identifier is inactivated and the process continues at block 400. In other embodiments, receipt of an event identifier does not result in active, previously stored event identifiers being inactivated.

If the contact information exchange device does not receive an event identifier, at block 410, it is determined whether the contact information exchange device receives an event end indicator. If the contact information exchange device receives an event end indicator, at block 415, an active event identifier is inactivated and the process repeats at block 400. In one embodiment, all active previously Stored event identifiers are inactivated. In another embodiment, only a most recently stored event identifier is inactivated. In still another embodiment, only an event identifier associated with the event end indicator is inactivated. In yet another embodiment, receipt of an end event indicator inactivates an event identifier associated with that end event indicator a well as any event indicators associated with sub-events of a larger event associated with the end event indicator (e.g., an end event identifier associated with a multi-day conference event inactivates an event identifier for the multi-day conference event as well as any event identifiers for meeting events associated with the multi-day conference event).

If the contact information exchange device does not receive an event end indicator, at block 420, it is determined whether a signal from another contact information exchange device is received. If a signal from another contact information exchange device is received, at block 425, the contact information exchange device establishes a communication link with the other contact information exchange device. At block 430, the contact information exchange device receives contact information from the other contact information exchange device. At block 435, the contact information exchange device stores the contact information in memory and associates the contact information with an active event identifier, if an active event identifier is stored by the contact information exchange device. In one embodiment, the contact information is associated with active event identifiers stored by the contact information exchange device. In one embodiment, the contact information exchange device emits a humanly perceivable indicator (e.g., a light, a color change, a sound, a vibration, or any other humanly perceivable indicator) upon successful receipt and storage of contact information. In another embodiment, the contact information exchange device transmits a confirmation signal to another device (e.g., a mobile phone of the user wearing the information exchange device) upon successful receipt and storage of contact information. At block 440, the contact information exchange device transmits resident contact information to the other contact information exchange device and the process repeats at block 400. In various embodiments, the resident contact information is an identifier associated with the wearer of the contact information exchange device. In one embodiment, the resident contact information uniquely identifies an individual (e.g., the wearer of the information exchange device). In various other embodiments, the resident contact information identifies an entity or group of individuals (e.g., a business, a group within a business, a non-profit group, etc.).

If, at block 420, a signal from another contact information exchange device is not received, at block 445, it is determined whether a download request signal is received from a base station associated with a user associated with the contact information exchange device. If a download request signal is received from a base station associated with a user associated with the contact information exchange device, at block 450, the contact information exchange device transmits its stored contact information to the base station and the process repeats at block 400. In one embodiment, transmitting the stored contact information includes transmitting information regarding the event indicator or event indicators associated with the stored contact information. In another embodiment, after the contact information exchange device receives confirmation of receipts of the stored contact information, the stored contact information is deleted. In one embodiment, all stored contact information is transmitted and/or deleted as a unit. In another embodiment, each individual unit of contact information is transmitted and/or deleted separately. In other embodiments, other amounts of contact information are transmitted and or deleted as units.

If a download request signal is not received from a base station associated with a user associated with the contact information exchange device, at block 455, it is determined whether a threshold amount of time has passed since the contact information exchange device broadcast a signal indicating its presence. If a threshold amount of time has passed since the contact information exchange device broadcast a signal indicating its presence, at block 460, the contact information exchange device broadcasts a signal indicating its presence and the process repeats at block 400. If a threshold amount of time has not passed since the contact information exchange device broadcast a Signal indicating its presence, the process repeats at block 400.

In one embodiment, the wireless device, or contact information exchange system, can communicate with a base station. The base station can be a mobile phone or other mobile device, a computer (e.g., laptop, desktop, tablet, etc.), a dedicated peripheral device attachable to a computer or mobile phone (e.g., via a USB port or other wired or wireless connection) with software executing on the dedicated peripheral device, the computer or mobile phone, and/or an online service to provide any of the various features of the base station. The wireless device can upload to the base station any contact information received by the wireless device. In one embodiment, the contact information is an identifier. The base station contacts a service provider to obtain the contact information associated with the identifier. The user can then add the contact information to a user's contacts list or otherwise store the contact information for later retrieval.

In one embodiment, the contact information exchange device is equipped with a hardcoded identifier, the hardcoded identifier being linked to a user and becoming contact information. In another embodiment, the contact information associated with the wearer is uploaded to the contact information exchange device.

Figure 5:
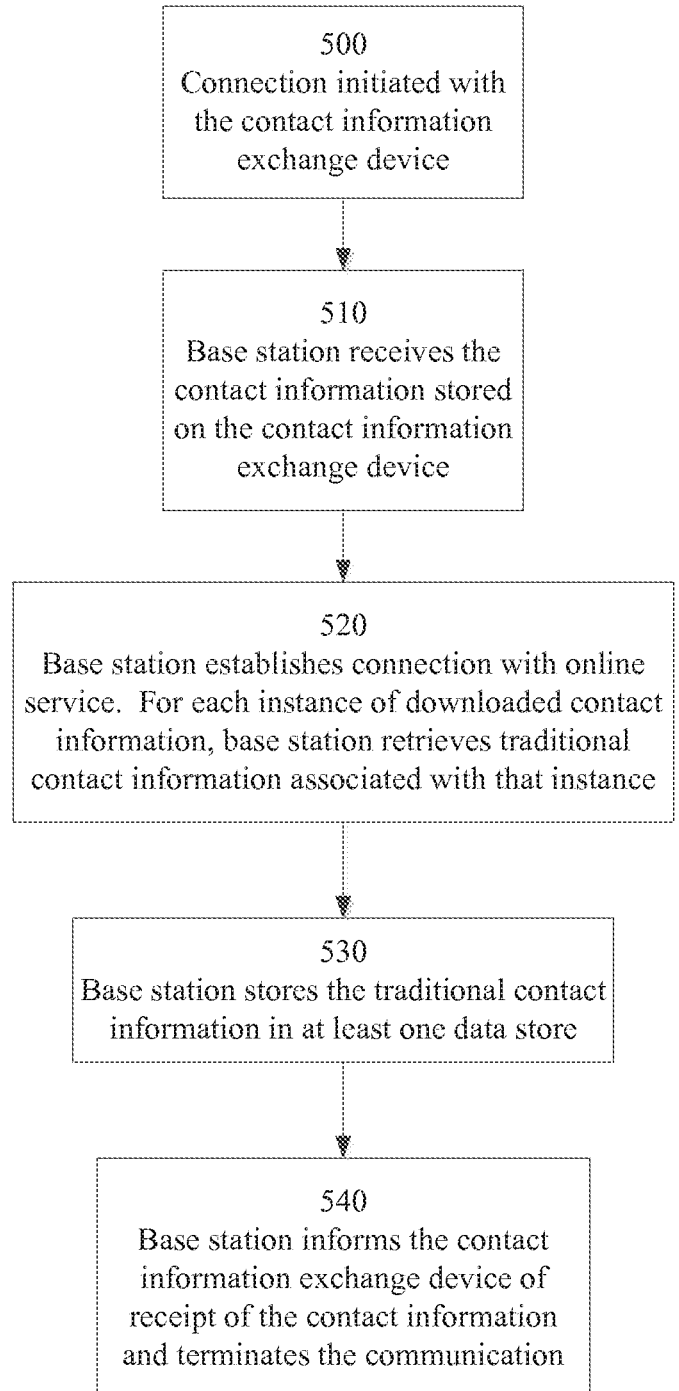
FIG. 5 is a flow diagram of the operation of a base station in accordance with one embodiment.

FIG. 5 is a flow diagram of the operation of a base station in accordance with one embodiment. At block 500, a connection is initiated with the contact information exchange device. The connection can be initiated as the result of the base station detecting the presence of the contact information exchange device (e.g., by receiving a response to the base station announcing its presence, by detecting the contact information exchange device announcing its presence, by a physical connection, or by any other suitable detection scheme) or by a user manually initiating a synchronization action (e.g., utilizing software running on a computer attached to the base station).

In various embodiments, the connection is a secure connection, requiring the base station to prove its association with a user or other entity, involving encryption protected transmission of data, and/or involving data being encrypted when stored and requiring decryption by an authorized user associated with the contact information exchange device to access the unencrypted contact information captured by the OOP tact information exchange device.

At block 510, the base station receives the contact information stored on the contact information exchange device. The contact information is an identifier associated with a user; however, in other embodiments, the contact information can be a mailing address, a phone number, an e-mail address, a screen name, a user name or any other suitable information useable to contact someone. At block 520, the base station establishes a connection with an online service and for each instance of downloaded contact information, the base station retrieves traditional contact information (e.g., a mailing address, a phone number, an e-mail address, a screen name, a user name or any other suitable information useable to contact someone) associated with that instance.

At block 530, the base station stores the traditional contact information in at least one data store (e.g., a contacts list in Microsoft Outlook, Gmail, or any other local or online contact data store). At block 540, the base station informs the contact information exchange device of receipt of the contact information and terminates the communication.

In one embodiment, the base station searches for schedule information of the user. The schedule information can be events in an electronic calendar (e.g., a Microsoft Outlook Calendar, a Microsoft Live Calendar, a Google Calendar, etc.) or from a social networking site (e.g., a Facebook event). The base station presents one or more scheduled events to the user and the user is able to associate one or more contacts with a scheduled event (e.g., an alumni mixer, an association s dinner, a fundraising event, a trade show, a conference, etc.). Further, in one embodiment, the user can add additional notes to the contact information. In another embodiment, the base station (e.g., residing on a mobile phone) transmits an event identifier, an event begins, and/or an event ends signal to the contact information exchange device at or about the beginning or end of scheduled events. The event identifier can include the same number of bits as contact information stored by the contact information exchange device and be stored in the same memory as contact information.

In one embodiment, the contact information exchange device does not distinguish between contact information and event identifiers. The order in which contact information and event identifiers are received is preserved when stored by the contact information exchange device and/or when downloaded to a base station. In other embodiments, the number of bits used for event identifiers can be different from the number of bits used for contact information and the contact information exchange device may treat contact information and event identifiers differently.

In another embodiment, the wireless device is able to receive an event identifier (e.g., from a mobile phone having access to the user's schedule information). The wireless device can save the event identifier and automatically associate all received contact information with the event identifier until another event identifier is received or until an end event signal is received (e.g., also from the mobile phone). When the contact information is later uploaded via a base station, the event identifier can be used to automatically associate the contact information with the event associated with the event identifier.

Figure 6:
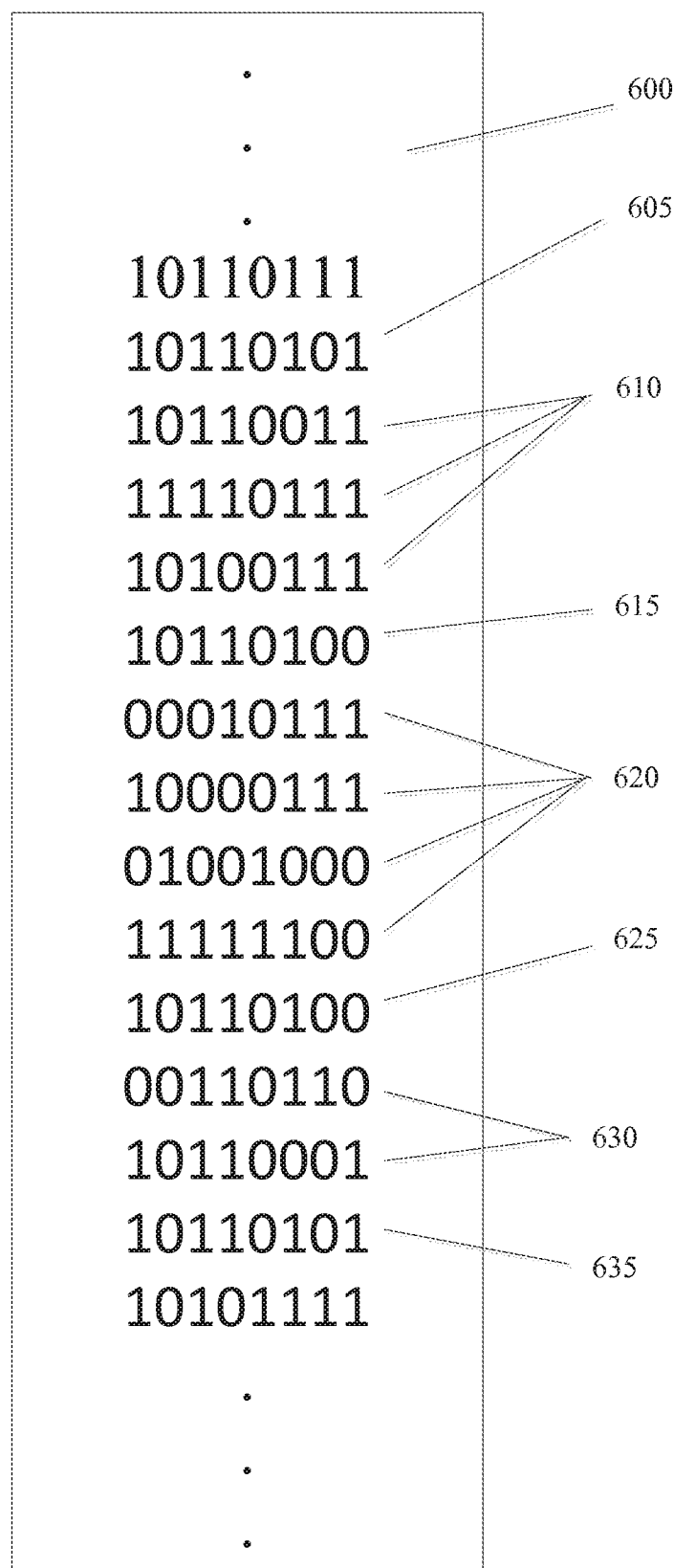
FIG. 6 illustrates a representation of a contact information exchange devices memory in accordance with one embodiment.

FIG. 6 illustrates a representation of a contact information exchange device's memory in accordance with one embodiment. The memory space 600 includes a plurality of identifiers stored therein. Identifier 605 is an event identifier for a conference. Identifier 605 is the first instance of this event identifier in memory space 600, meaning it represents a begin event point. Until this identifier appears again, indicating an end event point, all contact information stored in the memory space 600 is automatically associated with the conference event. In an alternative embodiment, whether an event identifier represents a beginning point or and ending point is controlled by interaction with a base station. For example, a contact information exchange device may upload and clear its memory space after a first day of the conference. The identifier for the conference might not appear again in the memory space 600 for another day or two, at which point, it would again be the first instance of the identifier in the memory space, but would represent and be identified using the base station as an end event point upon being uploaded to the base station.

Identifiers 610 are contact information identifiers. Each of these identifiers is associated with contact information for an individual, group or any other identifiable entity, and because they appear after identifier 605 and before another instance of that event identifier, they are all associated with the conference event. Identifier 615 is a meeting event identifier, indicating an event begin point, Identifiers 620 are contact information identifiers associated with both the conference event and the meeting event. Identifier 625 is a second instance of the meeting event identifier appearing as identifier 615, indicating an event end point. Identifiers 630 are contact information identifiers which, like identifiers 610, are associated with the conference event but not the meeting event. Identifier 635 is a second instance of the conference event identifier appearing as identifier 605, indicating an event end point.

In another embodiment, the base unit automatically sends a connection request (e.g., a friend request on Facebook, a connection request on. LinkedIn etc.) to the contacts uploaded from the wireless device. In still another embodiment, the base unit provides the user with an opportunity to approve or deny sending the connection request. In one embodiment, the base unit automatically inserts a reference to the event associated with the contact information (e.g., "It was a pleasure speaking with you at the animal shelter fundraiser last night"). In still another embodiment, the user is presented with an opportunity to edit the connection request before it is sent.

In one embodiment, a service is provided (e.g., online) to facilitate contact using the contact information exchange devices. The service collects contact information for users and assigns users unique identifiers. The service can also assign identifiers to events on a user's schedule (e.g., maintained by the service or obtained from any other source of the user's schedule such as the user's Microsoft Outlook Calendar, Google Calendar, Facebook Events, etc.) either online or using resident companion software at a base station or other computing device accessible by a user. Event information identifiers can be unique across users, unique only within a specific user, or unique for a user only within a specific time period or number of events event identifiers could be re-used for one user as different times or for different users at the same time).

The service can also receive an indication of user preferences for receiving automatic contact requests (e.g., introductory e-mails are ok to send automatically, and automatic connection requests are allowed to be sent to LinkedIn account, but not to the Facebook account), for automatically accepting contact requests (e.g., any LinkedIn connection request being sent as a result of a contact information exchange device information exchange, including automatically generated requests and manually generated requests from a user receiving the contact information via the device (such requests would, in various embodiments, indicate the sender's contact information exchange device was involved, but in other embodiments, the service could be granted access to user's accounts and recognize the requestor as being someone the user acquired contact information for using the user's own device and automatically accept the request as a result), are automatically accepted, but G+ requests are automatically rejected and Facebook friend requests are left to be dealt with manually), and for automatically sending connection requests. The above preferences can be set uniformly for the user, or the preferences can differ based upon events associated with the contact information (e.g., contact information associated with a business meeting or conference receives only a LinkedIn request for is accepted only on LinkedIn), while contact information associated with a class reunion or speed dating session receives only a Facebook request (or is accepted only on Facebook). It should be understood that the above social networking sites and the preference examples are provided as examples only, and that various embodiments interact with any social, business or other networking site, that a user can set any preference configuration desired and enabled by the system, and that, further, the service may, itself, be part of or include a social networking site.

In one embodiment, the wireless communications enabled device is equipped with art on/off mechanism (e.g., a switch, a button, a ring band presence sensor, a linger presence sensor, etc.). In another embodiment, the wireless communications enabled device includes a contact receipt indicator, in one embodiment the indicator is any visual indicator, audible indicator, or tactile indicator, including but not limited to a light emitting diode (LED) or a vibration device. In one embodiment, the indicator activates upon receipt of contact information and remains active a pre-set amount of time. In another embodiment, the indicator activates upon receipt of contact information and remains active until deactivated manually.

Figure 7:
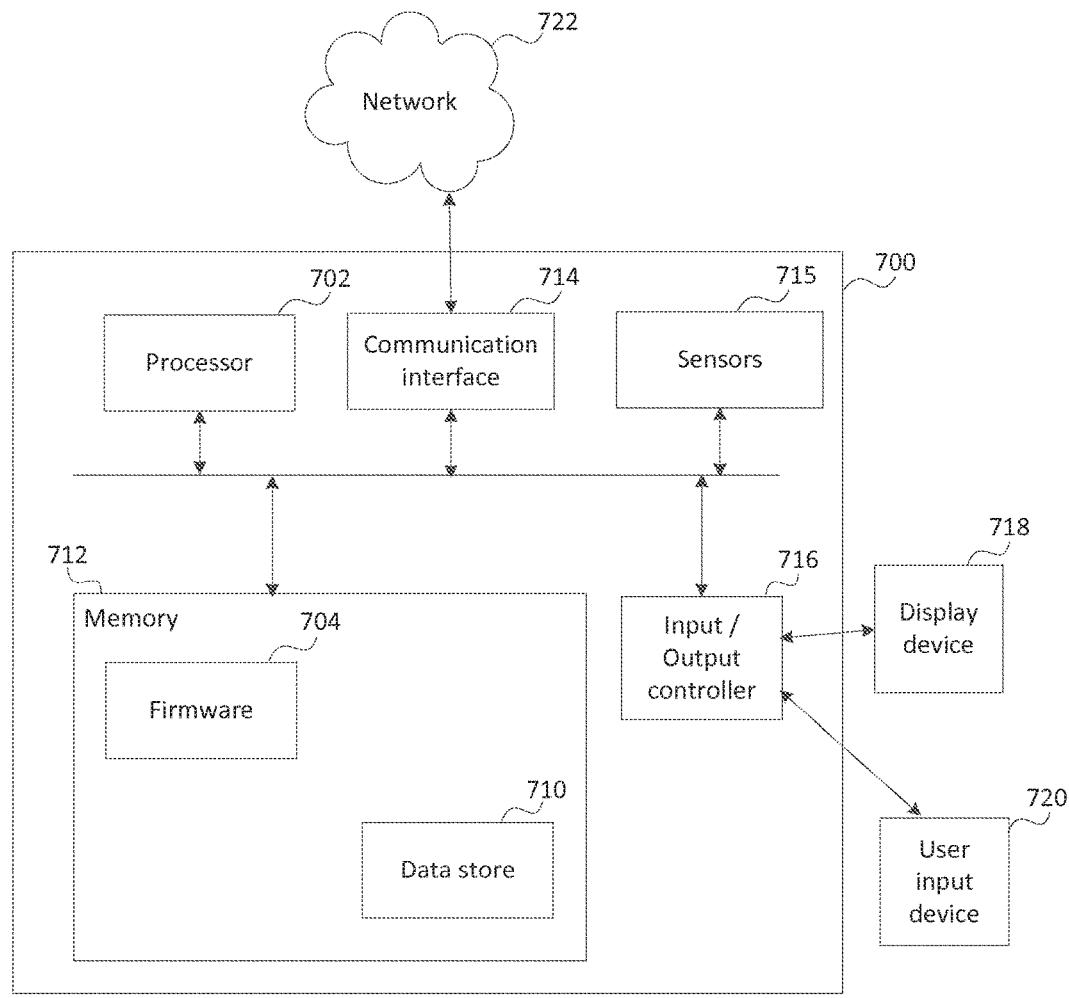
FIG. 7 illustrates an exemplary computing-based device which embodiments of a base station may be implemented.

FIG. 7 illustrates various components of an exemplar computing-based device 700 which may be implemented as any form of a computing and/or electronic device, and in which embodiments of a base station or a logging and communications device may be implemented.

Computing-based device 700 comprises one or more processors 702 which may be microprocessors, controllers or any other suitable type of processors for processing computer executable instructions to control the operation of the device in order to communicate data between moving animals; or to sense, log and communicate data between moving animals. In some examples, for example where a system on a chip architecture is used, the processors 702 may include one or more fixed function blocks (also referred to as accelerators) which implement a part of the method of communicating data between moving animals in hardware (rather than software or firmware). Firmware 704 or an operating system or any other suitable platform software may be provided at the computing-based. Data store 710 is available to store sensor data log entries, parameters, logging regimes and other data.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data, Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but signals per se, propagated or otherwise, are not examples of computer storage media. Although the computer storage media (memory 712) is shown within the computing-based device 700 it will be appreciated that the storage may be distributed or located remotely and accessed via a network 722 or other communication link (e.g., using communication interface 714).

The computing-based device 700 also comprises an input/output controller 716 arranged to output display information to a display device 718 which may be separate from or integral to the computing-based device 700. The display information may provide a graphical user interface. The input/output controller 716 is also arranged to receive and process input from one or more devices, such is a user input device 720 (e.g., a mouse, keyboard, camera, microphone or other sensor). In some examples the user input device 720 may detect voice input, user gestures or other user actions and may provide a natural user interface. This user input may be used to change parameter settings, view logged data, access control data from the device such as battery status and for other control of the device. In an embodiment the display device 718 may also act as the user input device 720 if it is a touch sensitive display device. The input/output controller 716 may also output data to devices other than the display device, e.g., a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g., in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer for computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve, any or all of the stated problems or those that have any or all of the stated benefits and advantages. It will further be understood that reference to an item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more, individual embodiments, those skilled in the art could make numerous alterations to the disclosed embodiments without departing from the spirit or scope of this specification.

What is claimed is:

1. A wearable device comprising:
    a wearable housing configured as a ring, the wearable housing being wearable on a finger; a transceiver embedded in the wearable housing and configured to receive a first data item, the transceiver being further configured to transmit a second data item to a base station or other device;
    wherein the transceiver is associated with unique identification information;
    wherein the wearable device further comprises a battery and a unit for charging the battery using induction from a charging station, direct current from a charging station, a photovoltaic or solar device, or motion to electricity device; and
    wherein a transmission of data through a connection utilizes a secure connection, the secure connection involving encryption protected transmission of data or involving data being encrypted when stored and requiring decryption by an authorized user.

2. The wearable device of claim 1, further comprising a processing unit.

3. The wearable device of claim 1, further comprising a visual indicator.

4. The wearable device of claim 3, wherein the visual indicator is a light emitting diode.

5. The wearable device of claim 1, further comprising an audible indicator.

6. The wearable device of claim 1, further comprising a tactile indicator.

7. The wearable device of claim 1, further comprising a ring band presence sensor.

8. The wearable device of claim 1, further comprising a finger presence sensor.

9. The wearable device of claim 1, further comprising a device presence sensor.

10. The wearable device of claim 1, further comprising a presence sensor.

11. The wearable device of claim 1, wherein the other device includes a second wearable housing that is a second ring.

12. The wearable device of claim 11, wherein the first and second rings are configured for a presence broadcasting ring of the first and second rings to broadcast its presence and a presence detecting ring of the first and second rings to detect the broadcast presence and establish two-way communications with the presence broadcasting ring.

13. The wearable device of claim 11, wherein a communication between the first and second ring triggers a connection request being sent on a social networking platform to at least one user associated with the first or second ring.

14. The wearable device of claim 13, wherein a social networking platform is provided as a service to facilitate contact.

15. The wearable device of claim 14, wherein the service is configured to associate identifiers with events on a schedule of the at least one user.

16. The wearable device of claim 14, wherein the service is configured to receive an indication of user preference settings for sending automatic contact requests and for automatically accepting contact requests.

17. The wearable device of claim 1, the wearable housing comprising a decorative portion extending from a circular band portion of the ring.

18. The wearable device of claim 1, wherein the base station senses, logs, and communicates data between moving animals.

19. The wearable device of claim 1, wherein the base station communicates with a network.

20. The wearable device of claim 1, wherein the base station outputs display information to a display device.

21. The wearable device of claim 1, wherein the base station includes an input/output controller configured to receive and process input from one or more devices.

22. The wearable device of claim 21, where the one or more devices include a user input device, a mouse, a keyboard, a camera, a microphone, or a sensor.

23. The wearable device of claim 21, wherein the one or more devices include a user input device, wherein the user input device is operable impact control of the base station or authentication of a user.

24. The wearable device of claim 22, wherein the user input device is operable to detect voice input or user gestures.

25. The wearable device of claim 1, wherein the transceiver is enclosed within a band of the ring.

26. A wearable device comprising:
a wearable housing configured as a ring, the housing being wearable on a finger; and at least one RFID transceiver attached to the wearable housing and configured to receive power through induction by an electromagnetic field of a base station, the transceiver being further configured to receive a first data item from the base station, the transceiver being further configured to transmit a second data item to the base station,
wherein the transceiver is associated with unique identification information, wherein the second data item transmitted between the transceiver and the base station is secure,
wherein the base station is configured to detect the information transmitted by the transceiver when the wearable device is positioned within range of a certain portion of the base station and to transmit, in response to identification by an identification unit, the second data item or information associated with the second data item to a service provider or an application, and
wherein a transmission of data through a connection utilizes a secure connection, the secure connection involving encryption protected transmission of data or involving data being encrypted when stored and requiring decryption by an authorized user.

27. The wearable device of claim 1, wherein the base station is a computer or dedicated peripheral device attachable to a computer or mobile phone via a USB port, a wired connection, or a wireless connection and the base station executes software on the base station or an online service to provide features of the base station.

28. The wearable device of claim 1, wherein the wearable device is configured to detect a compatible device or the base station, the wearable device and the compatible device or the base station are configured to engage in a transaction in which identification information is communicated.

29. The wearable device of claim 28, wherein the base station is configured to store the identification information communicated during the transaction.

30. The wearable device of claim 1, wherein communicative range of the wearable device is less than a foot.

31. The wearable device of claim 1, wherein the wearable device is configured to transmit a confirmation signal to another device upon successful receipt and storage of the identification information.

32. The wearable device of claim 1, wherein the wearable device is configured to delete stored identification information after the wearable device transmits the stored identification information to the base station and receives confirmation of receipt of the stored identification information.

33. The wearable device of claim 1, wherein the wearable device is connected to an online service that facilitates transmission of identification information of the wearable device.

34. The wearable device of claim 1, wherein the wearable device is connected to an online service that is configured to receive an indication of user preference settings.

35. The wearable device of claim 1, wherein the base station is configured to output display information to a display device and receive and process input from a user input device that allows user to change parameter settings.

36. The wearable device of claim 1, wherein the transceiver is within or below with a decorative portion of the ring.

37. The wearable device of claim 26, wherein the base station is a computer or dedicated peripheral device attachable to a computer or mobile phone via a USB port, a wired connection, or a wireless connection and the base station executes software on the base station or an online service to provide features of the base station.

38. The wearable device of claim 26, wherein the wearable device is configured to detect a compatible device or the base station, the wearable device and the compatible device or the base station are configured to engage in a transaction in which identification information is communicated.

39. The wearable device of claim 26, wherein communicative range of the wearable device is less than a foot.

40. The wearable device of claim 26, wherein the wearable device is configured to transmit a confirmation signal to another device upon successful receipt and storage of the identification information.

41. The wearable device of claim 26, wherein the wearable device is connected to an online service that facilitates transmission of identification information of the wearable device.

42. The wearable device of claim 26, wherein the wearable device is connected to an online service that is configured to receive an indication of user preference settings.

43. The wearable device of claim 26, wherein the base station is configured to output display information to a display device and receive and process input from a user input device that allows user to change parameter settings.

44. The wearable device of claim 26, wherein the transceiver is within or below with a decorative portion of the ring.

45. The wearable device of claim 26, wherein the base station senses, logs, and communicates data between moving animals.

46. The wearable device of claim 26, wherein the base station communicates with a network.

47. The wearable device of claim 26, wherein the base station outputs display information to a display device.

48. The wearable device of claim 26, wherein the base station includes an input/output controller configured to receive and process input from one or more devices.

49. The wearable device of claim 48, where the one or more devices include a user input device, a mouse, a keyboard, a camera, a microphone, or a sensor.

50. The wearable device of claim 48, wherein the one or more devices include a user input device, wherein the user input device is operable impact control of the base station or authentication of a user.

51. The wearable device of claim 50, wherein the user input device is operable to detect voice input or user gestures.

* * * * *